No. 703,576. Patented July 1, 1902.
G. HALLENSCHEID.
TWISTED AUGER.
(Application filed Aug. 8, 1901.)
(No Model.)
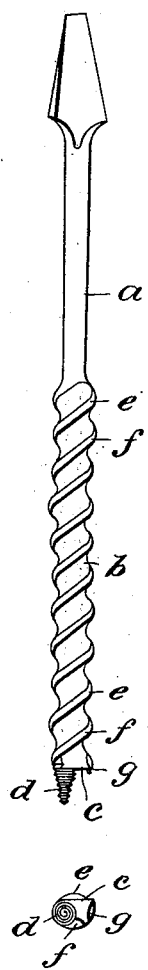
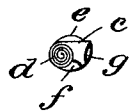
Witnesses:
Rose E. Babcock
C. D. Davis
Inventor:
Gustav Hallenscheid
by W H Babcock
Attorney

UNITED STATES PATENT OFFICE.

GUSTAV HALLENSCHEID, OF RONSDORF, GERMANY.

TWISTED AUGER.

SPECIFICATION forming part of Letters Patent No. 703,576, dated July 1, 1902.

Application filed August 8, 1901. Serial No. 71,357. (No model.)

*To all whom it may concern:*

Be it known that I, GUSTAV HALLENSCHEID, a subject of the King of Prussia, Emperor of Germany, and a resident at Ronsdorf, in the Kingdom of Prussia, Germany, have invented new and useful Improvements in Twisted Augers, of which the following is a specification.

The subject of my present invention is a twisted auger which distinguishes itself from other augers of like nature in that its screw-thread is disposed eccentrically to the cutting edge, whereby there is obtained this advantage that the hole is larger than the diameter of the auger.

The auger is represented in the accompanying drawing.

The construction is as follows: The shaft $a$ runs out into a flat bar $b$, which is twisted into the form of a screw the width of which corresponds to that of the cutting edge $c$ measured from the axis of the screw $d$. The edge $e$ of the bar $b$ is formed into a screw $d$ and the edge $f$ into a cutter $g$ of any desired shape, and between the two the bar $b$ is formed into a cutting edge $c$, which may be disposed at any desired angle to the axis of the screw $d$.

Having thus described my invention, what I claim is—

A twisted auger with screw-thread disposed eccentrically to the cutting edge and characterized by having the edge $e$ of the worm $b$ run out into a screw $d$, the edge $f$ into a cutter $g$, between which the worm $b$ is extended into a cutting edge $c$, formed at any desired angle to the axis of the screw $d$, substantially as described.

In witness whereof I have hereunto set my hand in presence of two witnesses.

GUSTAV HALLENSCHEID.

Witnesses:
  OTTO KÖNIG,
  FRITZ TEBERS.